(12) United States Patent  
Higginson

(10) Patent No.: US 11,469,827 B2  
(45) Date of Patent: Oct. 11, 2022

(54) CLOCKSPEED GRAVITATIONAL NON-ELECTROMAGNETIC SPECTRUM WIRELESS COMMUNICATIONS

(71) Applicant: Timothy B. Higginson, Cohasset, MA (US)

(72) Inventor: Timothy B. Higginson, Cohasset, MA (US)

(73) Assignee: Timothy B. Higginson, Cohasset, MA (US)

(*) Notice: Subject to any disclaimer, the term of this patent is extended or adjusted under 35 U.S.C. 154(b) by 0 days.

(21) Appl. No.: 17/237,162

(22) Filed: Apr. 22, 2021

(65) Prior Publication Data

US 2021/0384990 A1   Dec. 9, 2021

Related U.S. Application Data

(60) Provisional application No. 63/036,005, filed on Jun. 8, 2020.

(51) Int. Cl.
*H04L 27/00* (2006.01)
*H04B 14/00* (2006.01)

(52) U.S. Cl.
CPC .................... *H04B 14/00* (2013.01)

(58) Field of Classification Search
CPC .... H04B 14/00; H04B 7/185; H04W 56/0035

USPC .................................................. 375/259, 354
See application file for complete search history.

(56) References Cited

U.S. PATENT DOCUMENTS

| 6,714,201 B1* | 3/2004 | Grinstein ................ G06T 13/20 700/61 |
| 2019/0052637 A1* | 2/2019 | Dean ...................... H04W 12/47 |
| 2020/0064439 A1* | 2/2020 | Przybyla .................. G01S 5/30 |

\* cited by examiner

*Primary Examiner* — Don N Vo
(74) *Attorney, Agent, or Firm* — Leydig, Voit & Mayer, Ltd.

(57) ABSTRACT

A wireless communications and imaging system is described. The system includes a receiver and a transmitter. The receiver includes a synchronized array of clocks, wherein a speed of time measured by each one of the clocks in the synchronized array of clocks relative to the other clocks is tracked. The transmitter includes a constellation of masses. A relative position of individual ones of the masses of the constellation of masses (with respect to one another) encodes digital data that is sensed by the receiver in the form of a gravity field change that causes a difference in the speed of clocks measured and utilized by the quantifiable receiver which clock speed differential corresponds to and enables the replication of the original digital data set that was input into the transmitter.

8 Claims, 12 Drawing Sheets

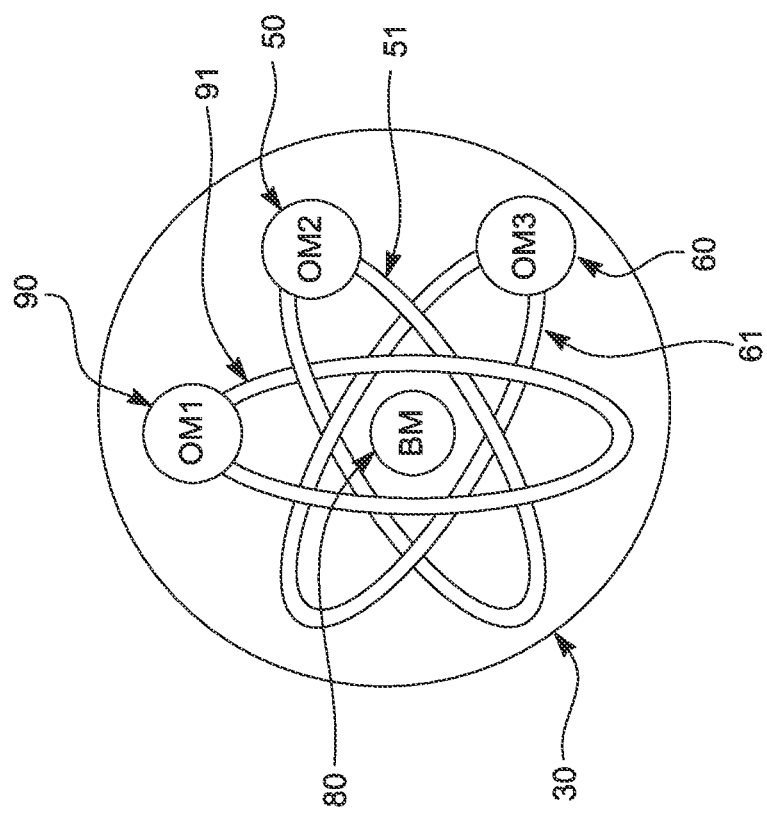
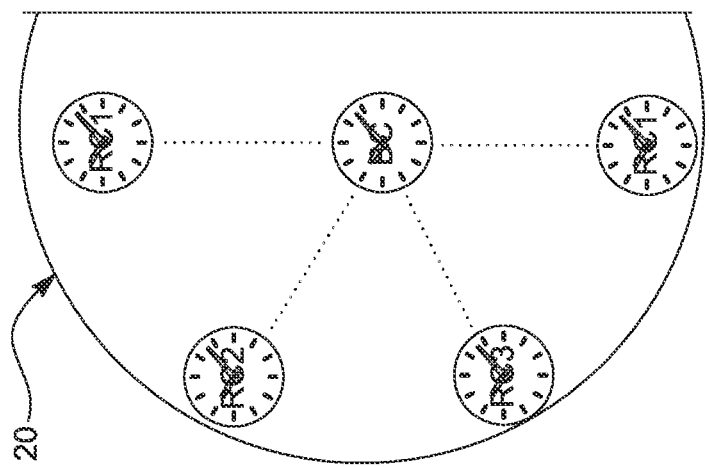
FIG. 5

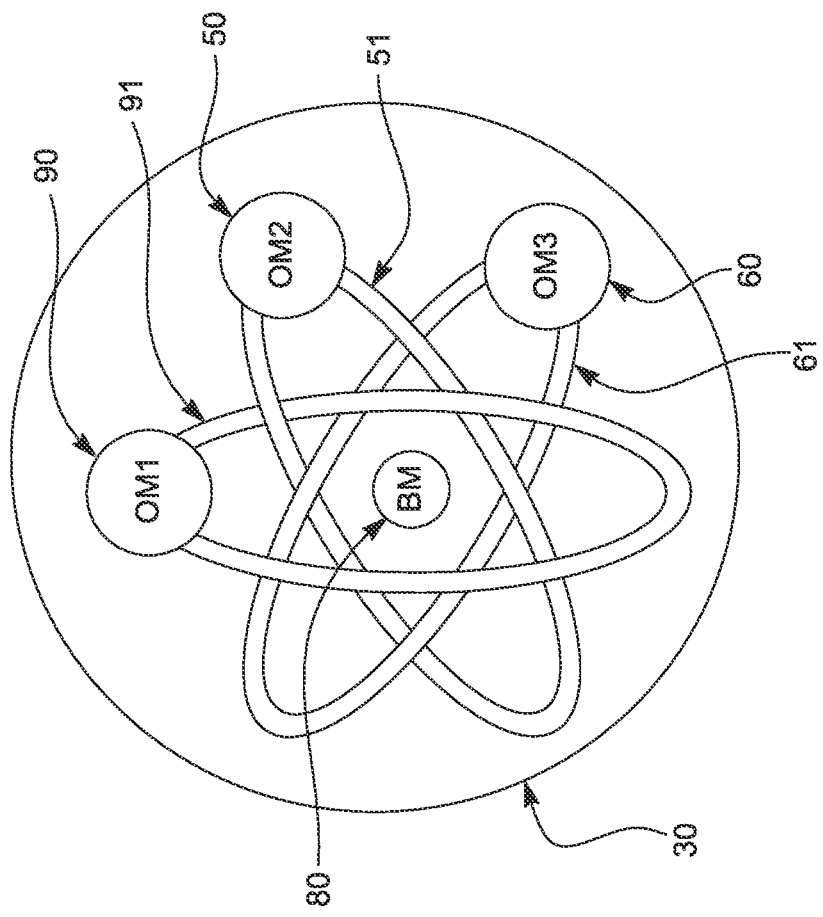
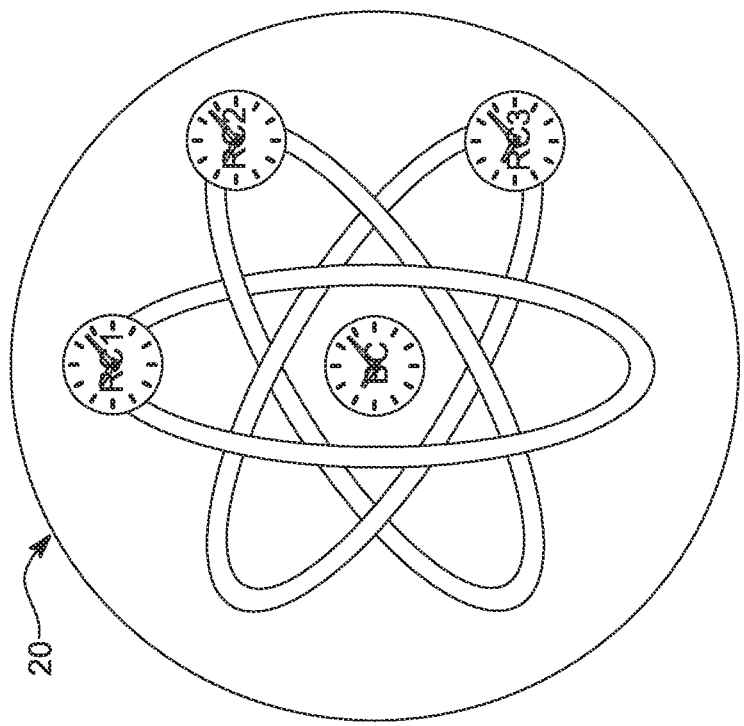
FIG. 10

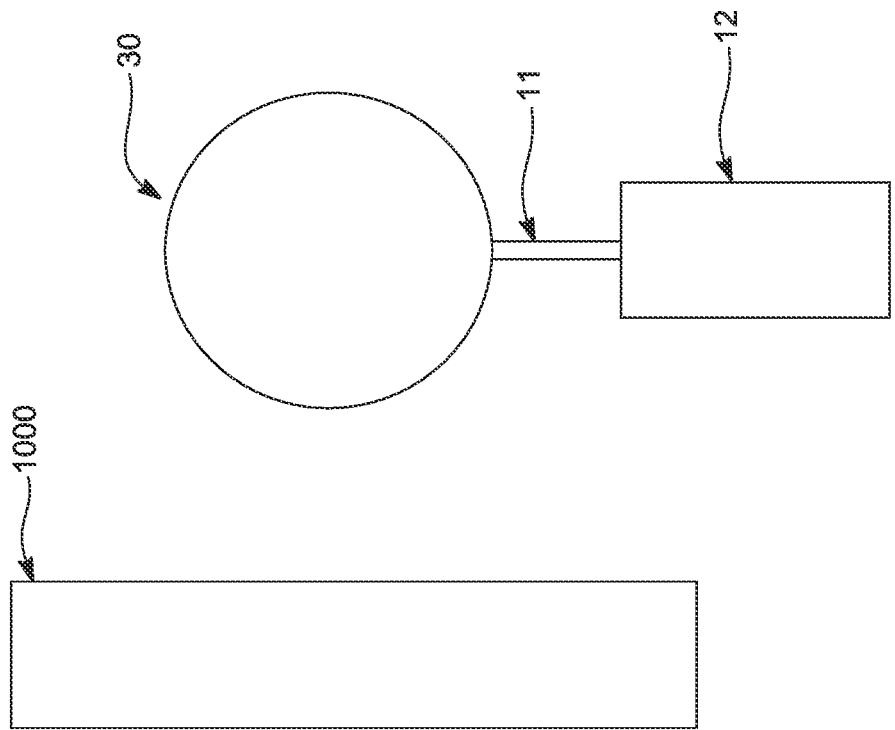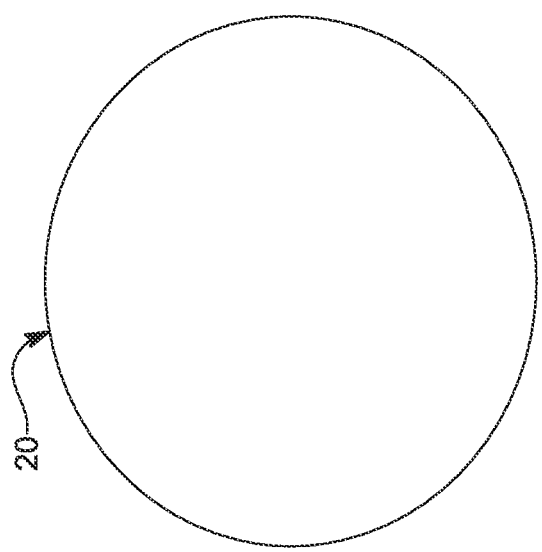
FIG. 11

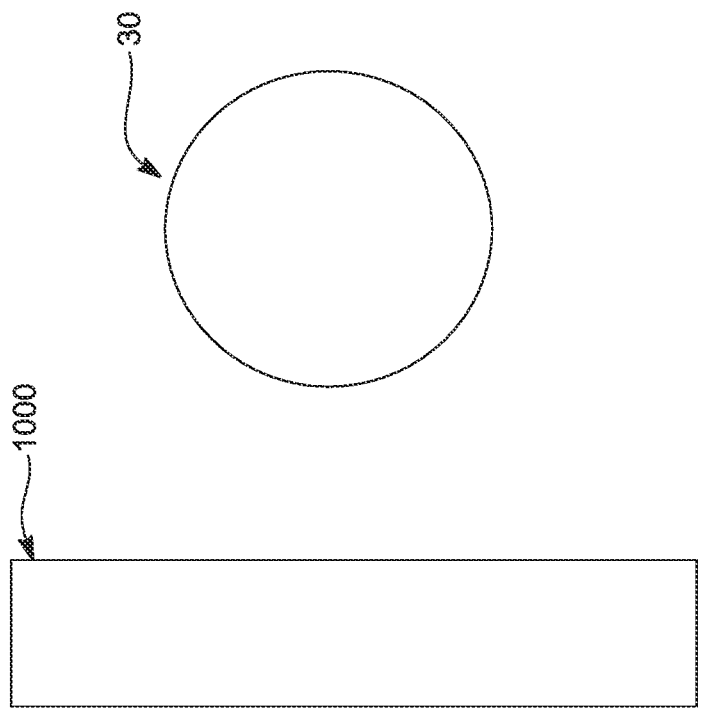
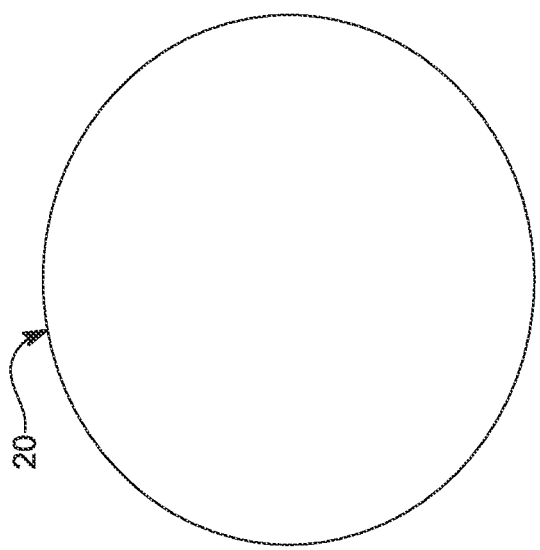
FIG. 12

CLOCKSPEED GRAVITATIONAL NON-ELECTROMAGNETIC SPECTRUM WIRELESS COMMUNICATIONS

CROSS-REFERENCE TO RELATED APPLICATIONS

This application claims the benefit of U.S. Provisional Application No. 63/036,005, filed Jun. 8, 2020, which is expressly incorporated by reference in its entirety, including any references contained therein.

FIELD OF THE DISCLOSURE

The present disclosure generally relates to a wireless communication and imaging system ("WCIS") based on measuring the differential in clock speeds amongst a system of synchronized constellation of clocks (a "Multidirectional Sensitive Orbital Receiver" or "MSOR") in relation to one or more systems of self-orbiting, synchronized constellation of masses (each, a "Synchronized Orbital Mass Transmitter" or "SOMT").

BACKGROUND

Current wireless communications systems use frequencies in the electromagnetic spectrum.

There is extraordinary demand and numerous conflicting needs for many of these frequencies. Many technologies have been developed to make more efficient use of them, and to allow uses that might otherwise be ineffective due to interference.

Nevertheless, there is a limited number of frequencies, particularly in frequency bands that are most effective for certain uses.

BRIEF SUMMARY

In accordance with the present disclosure, a wireless communications and imaging device/system is described. The system includes a receiver and a transmitter. The receiver includes a synchronized array of clocks, wherein a speed of time measured by each one of the clocks in the synchronized array of clocks relative to the other clocks is tracked. The transmitter includes a constellation of masses. A relative position of individual ones of the masses of the constellation of masses (with respect to one another) encodes digital data that is sensed by the receiver in the form of a gravity field change that causes a difference in the speed of clocks measured and utilized by the quantifiable receiver which clock speed differential corresponds to and enables the replication of the original digital data set that was input into the transmitter.

The WCIS provides a system for wireless communication (and imaging) that does not rely on the electromagnetic spectrum, and, hence, operates entirely outside the scarcity and other limitations therein. In place of the electromagnetic spectrum, the system relies on the established physics principles that underlie the and measurable differential in speeds at which clocks run at various points from mass(es) in a gravity well.

The physics of gravitational time dilation are well established and in commercial use. For example, it plays a fundamental role in correcting for the differential between clocks in the Global Positioning System's satellites and ground-based systems. The time differential in a gravity well has been measured in clocks as close as one meter apart in height at the earth's surface.

By building an array of synchronized clocks acting as a receiver (the MSOR), and a constellation of synchronized masses acting as a transmitter (the SOMT), the WCIS delivers the capability of transmitting complex sets of data from one or multiple transmission points to one or more receivers wirelessly without utilizing the electromagnetic spectrum.

Similarly, by interposing an object between an MSOR and an SOMT, the WCIS is able to algorithmically image a mass distribution within the interposed object.

BRIEF DESCRIPTION OF THE DRAWINGS

FIG. 5 illustratively depicts a parabolic receiver array and the enhanced transmitter depicted in FIG. 4;

FIG. 10 illustratively depicts a transmitter utilizing multiple positionable masses for encoding digital data, and a receiver utilizing multiple clocks for decoding such digital data;

FIG. 11 illustratively depicts a side view of a transmitter (i.e., an SOMT) and a receiver (i.e. an MSOR) with an object situated between the SOMT and the MSOR wherein the digital data set encoded into the SOMT is altered from a known state by the mass distribution inside the object such that the actual decoded data set received by the SMOR, when mapped against the encoded data set provides an image of the internal mass distribution of the object; and FIG. 12 illustratively depicts the arrangement described in FIG. 11 wherein the motion of the transmitting array is remotely and/or programmatically controlled thereby further enhancing the imaging capability of the internal mass distribution of the object located between the SOMT and the MSOR.

DETAILED DESCRIPTION OF THE DRAWINGS

Generally, the present disclosure relates to a non-electromagnetic spectrum wireless communication system consisting of at least a transmitter system and at least a receiver system.

Figure 1:
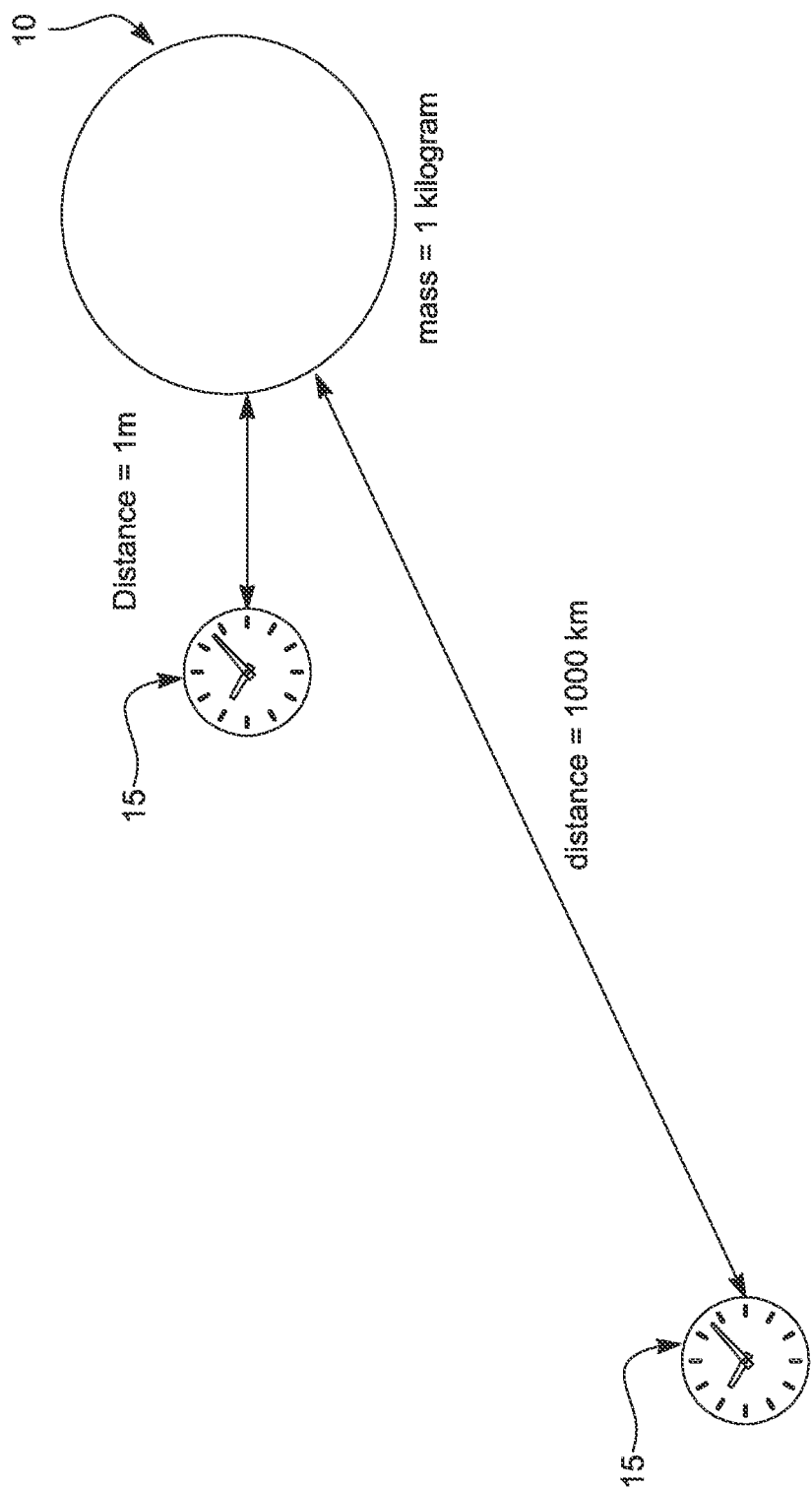
FIG. 1 illustratively depicts a basic system introducing a principal upon which the present disclosure is based.

FIG. 1 depicts two clocks 15 at different distances 5, 6 from a mass 10, with a differential in the clock speed being determined as a function of the distance of each clock from the mass. This system conforms to established physics behind the measurable time (clock speed) running at different speeds measured by clocks at different distances from a mass, such as clocks in orbits at different distances from the surface of a planet as in a clock in a GPS spacecraft in geo-stationary (approximately 22,300 miles above earth surface) orbit versus a clock in a mobile phone held by a person walking in a city at ground level.

Figure 2:
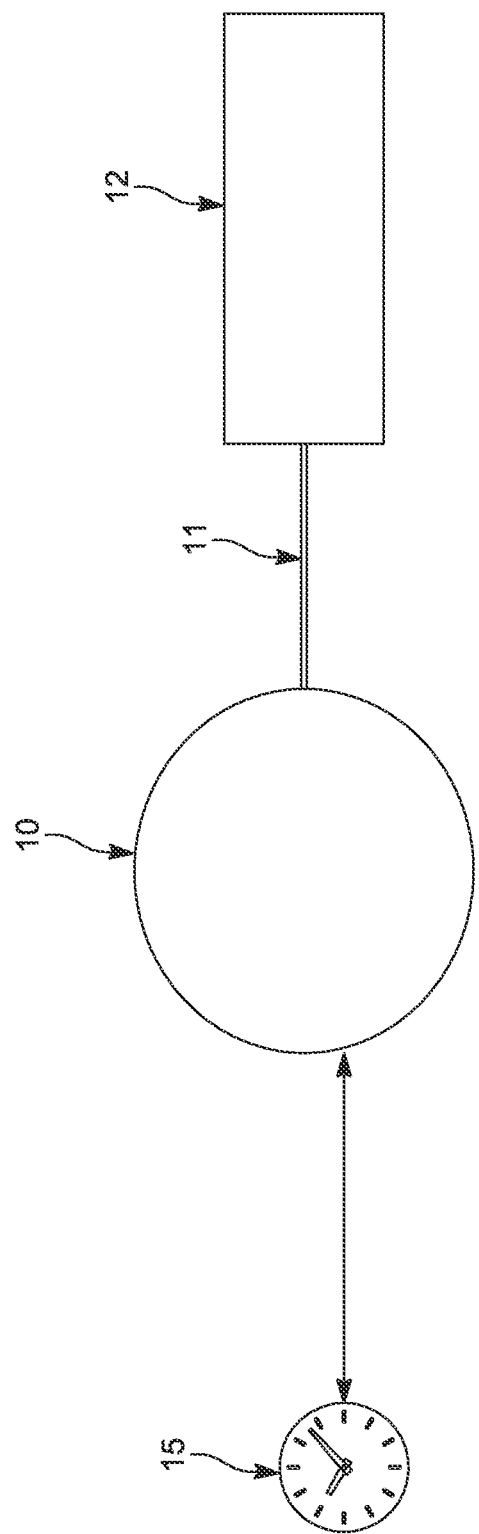
FIG. 2 illustratively depicts a basic wireless communications system with a transmitter (controlled positionable mass) and a receiver (clock enabled to measure changes in its clock speed)

FIG. 2 schematically presents an engine 12 driving a piston 11 that moves a mass 10 towards and away from a clock 15 thereby measurably altering the clock speed of the clock, and thereby permitting a wireless "transmission" or "communication" of ones and zeros by way of a "one" being the clock speed when the mass is closest to the clock and a "zero" being determined by the clock speed of the clock when the mass is at its farthest position away from the clock. The "ones" and "zeroes" can also be interpreted as dots and dashes, in which context, the system operates as non-electromagnetic spectrum wireless morse code communication system The schematic in this figure depicts a mass 10 located at the end of a piston-type motion controller 11, 12 wherein the mass moves in relation to a clock such that the distance between (i) the measurable center of the mass 10 and (ii) the measurable location of the clock increases and decreases based on the known piston controller. The distance between the clock and the mass is not needed to be known, only that the movement within the transmitter is controlled and measured, and the clock speed of the clock is measured.

In an implementation wherein the piston controller additionally rotates and there are multiple receiving clocks, wherein the rotation imparts an arc to the movement of the mass 10 relative to the clock 15, results in deterministic differentials among the clocks in a receiving array (the SMOR) as the mass 10 sweeps across the array of clocks imparting a different clock speed to each one such that a calculation of the clock speeds reproduces the arc of the mass, meaning that at any one instant position of the mass and over the continuum of the motion of the mass through its arc, the change in clock speeds mapped across the clocks converts into multiple data readings by the SMOR that translate into a multi-set data transmission in the form of the different clocks speeds of the clocks at any one time, and, separately across the timeframe of the swing of the mass 10 across the arc coded for transmission at the transmitter system 10, 11, 12.

Figure 3:
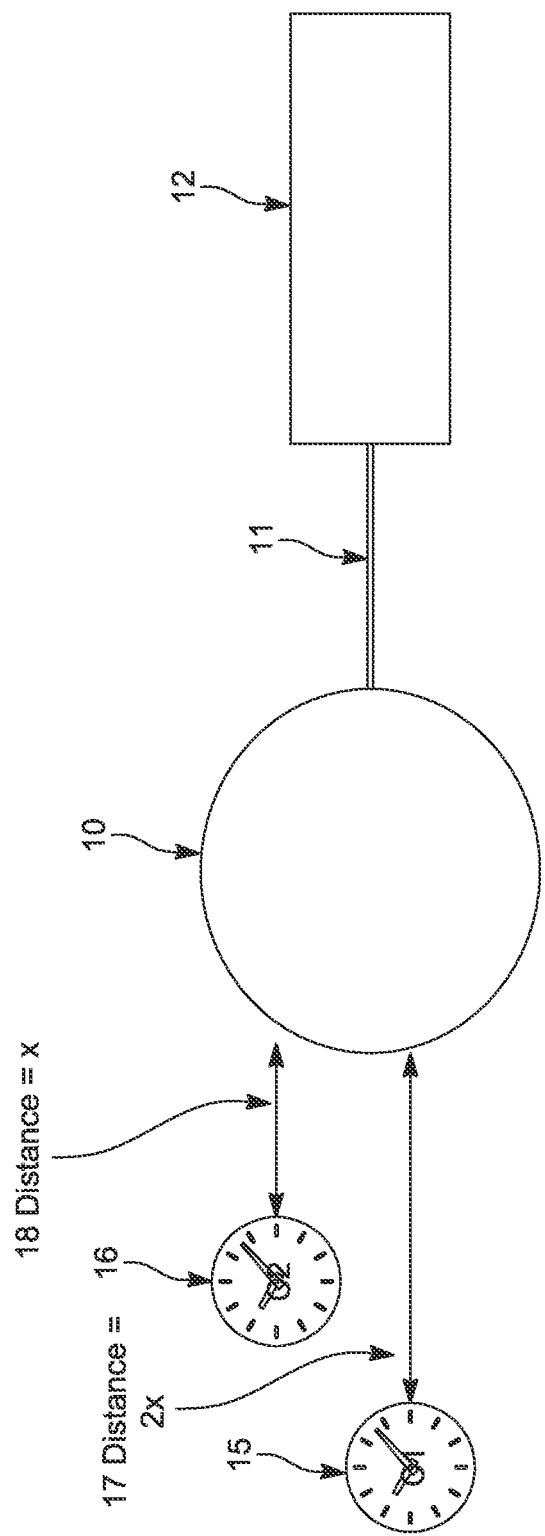
FIG. 3 illustratively depicts the system in FIG. 2 wherein a second clock has been added to enhance the receiver's information receipt and decoding capabilities.

FIG. 3 adds a second clock 16 to the depiction shown in FIG. 2, wherein the second clock 16 is at a different distance from the mass 10 than the first clock 15. The clock speed of each clock is deterministically and measurably different from the clock speed of the other clock based on the difference in distance from the mass 10, including as the piston 11 moves the mass 10 such that the distances between the mass and each of the clocks is changed by controlling the piston via the engine 12. By adding an arc to the motion of the mass 10 additional data is simultaneously and continuously transmitted to the clock array which data is measured and decoded based on the patterns in the change in clock speeds of the clocks in the receiving array caused by the motion of the transmitting masses.

In other words, this schematic depicts a mass 10 located at the end of a piston-type motion controller 11, 12 system wherein the mass 10 is moved in relation to two clocks 15, 16 with each such clock at different distances 17, 18 from the center of the mass 10, such that the distance between the center of the mass and two clocks increases and decreases based on the known piston controller, and, consequently, the measurable speed of the clocks changes independently and in relation to each other.

Figure 4:
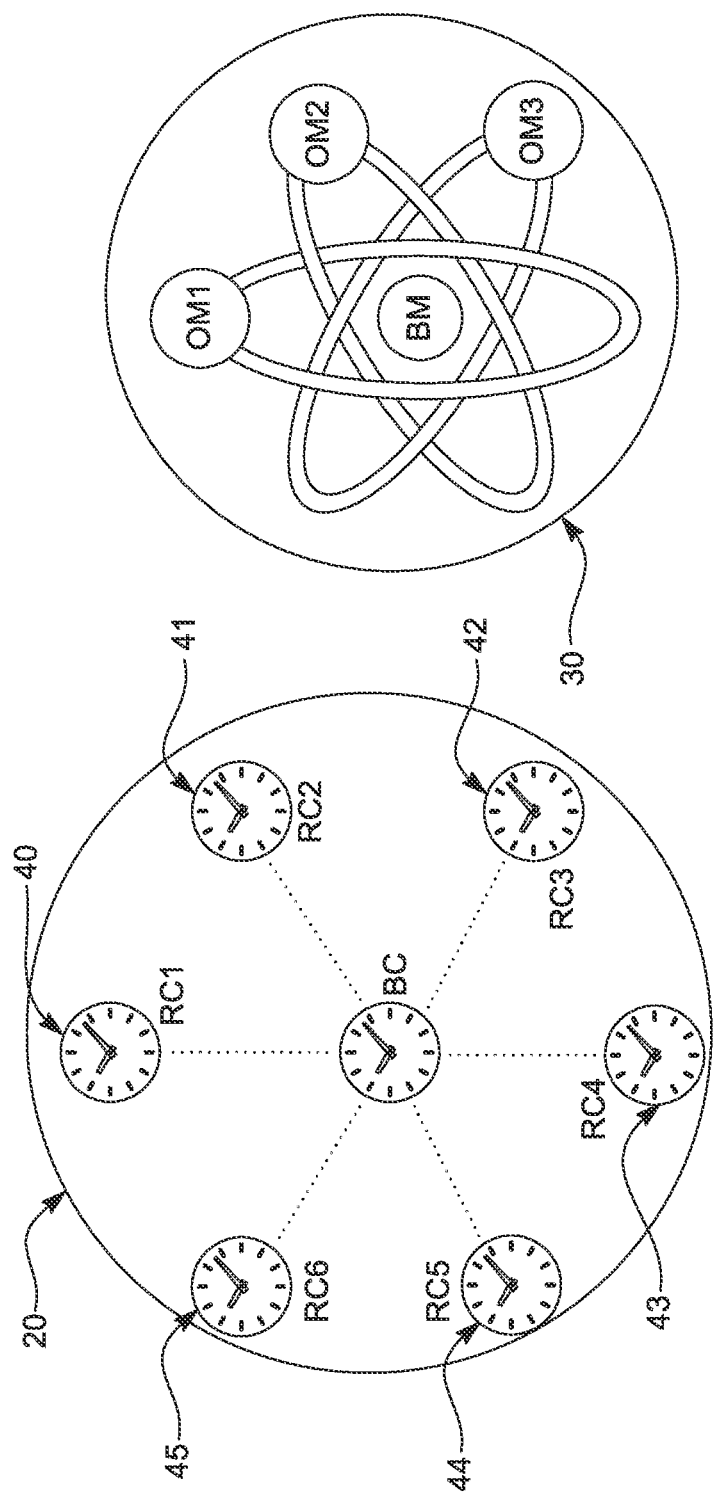
FIG. 4 illustratively depicts a wireless communications system consisting of an advanced receiver and an enhanced transmitter.

FIG. 4 depicts an integrated pattern of 20 of arrayed clocks at fixed locations relative to each other with a baseline clock 50 at the center that, taken as a whole, constitute a multi-data point receiver system. Further, this figure depicts an orbiting array of masses 30 that constitutes a transmitter 30 that is more fully described in FIG. 5.

Not shown in the figure are the computing systems that measure the clock speed of each clock in the receiving array as well as measuring their relative clock speeds in relation to each other. The internal and remote mechanisms of commercially available clocks that are enabled to measure such clock speed, as well as the computing systems that control and track their measurements are commercially available. The control systems for encoding a digital data set into the transmitter such that the masses are positioned relative to each other in patterns that reflect the digital data depend on the implementation of the receiver. A plurality of autonomous drones, each representing a single orbiting mass (and, together, representing a unified transmitter) utilize a remote computing system to translate the digital data set into relative positions of the orbiting masses relative to each other, and then communicate those positions to the onboard control software of each of the drones along with a command set for when to activate the sending of the message. In this way, digital data is encoded into such a transmitter.

An analogous system of autonomous drones, each containing a clock and wherein each drone follows an established orbital pattern relative to the other drones, in the receiver each capture and communicate their changing clockspeed to a central decoding system which utilizes the patterns of clock speed changes across the array of drones in the receiver to decode one or more transmissions of digital data from one or more transmitter sources. Fixed arrays of clocks (physically linked as depicted in FIG. 5) are utilized in a different implementation of the receiver, such as positioning the clocks on the surface of a (positionable or rotating) parabolic antenna. Further, not shown, is a full suite of types of receiving arrays, from spherical to parabolic to a flat plane and with more or fewer of the clocks arrayed in relation to the baseline clock 50.

Additionally, the orientation of the entire receiving array 20, much like an antenna array for electromagnetic spectrum reception, may be dynamically set, either by an overall physical structure on which the clocks are embedded, or by controlling the location of individual clocks of the array much as an array of autonomous drone aircraft are maintained in one or more patterns in relation to each other through a combination of propellers or thrusters on each drone controlled programmatically by pre-set or remote dynamic programming instructions to onboard controllers.

FIG. 5 depicts a multi-data point receiving array of clocks 20 structured with a center (baseline) clock with a parabolic arc of additional clocks arrayed around the center clock's locus, and further depicts a transmitting orbiting array of masses 30. With respect to the transmitting orbiting array 30, the figure shows an implementation of multiple masses with a baseline mass 80 and three orbiting masses 50, 60 and 90 in respective orbits 51, 61 and 91 around the baseline mass. The orbits are show as circular, but may be implemented as or dynamically changed to elliptical orbits depending on the complexity of the data being encoded and transmitted by the transmission mass array(s). Further, more or fewer orbiting masses may be utilized depending on the scope and density of data to be transmitted simultaneously to the receiving array.

As described in FIG. 4 regarding the locational controls for the static and/or dynamic individual and group movement and positioning of the receiving array of clocks, the transmitting array may be similarly structured and controlled.

The data being transmitted by the transmission array is encoded from a digital file into a series of coordinated movements of the masses in the transmitting array such that the receiving array's clocks' clock speeds will be altered in a pattern that is translated back into the contents of the original digital file.

Figure 6:
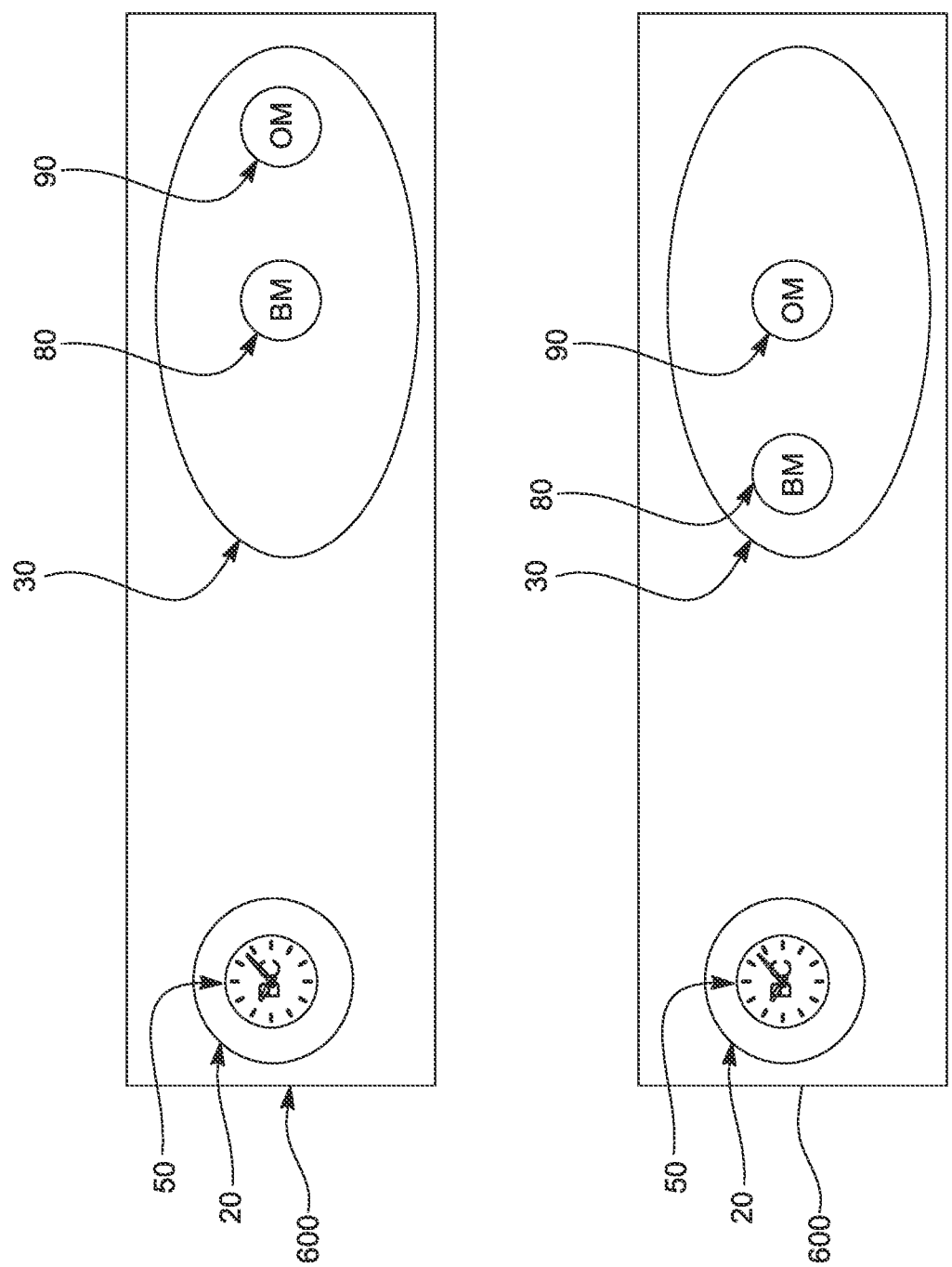
FIG. 6 illustratively depicts and contrasts two internal positions of a transmitter, one position encoding a "zero" and the second position encode a "one" which the depicted simplified receiver decodes respectively according to its changed clockspeed due to the contrasting encoding of the digital information in the two depicted states of the transmitter.

Please reference FIGS. 1, 2 and 6 for baseline implementations of encoding, transmitting and receiving and decoding a 1 or a 0 by this wireless system that does not utilize the electromagnetic spectrum to transmit the data. By extrapolating systematically from the simple instance, to more complex arrays of transmitting masses and arrays of receiving clocks, such as by increasing the numbers and coordinated motions of the masses, an increasingly complex set of data is transmitted to the receiving array, and as the receiving array increases comparably, it gains the ability to receive and decode a complex set of transmitted data.

A receiving array is pointed directionally at different transmitting arrays by either (i) using a gimbaled directionally-controlled array of clocks, or (ii) algorithmically using a spherical array of clocks. In the algorithmic instance, a single orbiting array of clocks receives transmissions from multiple differently-located transmissions arrays by tracking and matching patterns of differential clock speed changes across the array of clocks in the receiving array, whereby algorithmically comparing and de-segregating the differential clock speed change patterns decodes the original data file transmissions from multiple transmitter arrays.

FIG. 6 depicts a simplified state 600 wherein the transmitting array 30 has been programmatically positioned to transmit a zero to the receiving array 20, and a simplified state 601 wherein the transmitting array 30 has been programmatically positioned to transmit a one to the receiving array 20. The zero is represented in state 600 by the relative locations of the transmitting array's masses in that state 600 in contrast to the one that is represented by the relative locations of the transmitting array's masses in the other depicted state 601. The relative locations of the masses in each of the two transmitting array's states control and translate into different clock speeds in the receiving array's clock 20 without use of the electromagnetic spectrum. By measuring the clock speed of the receiving array's clock, the receiving array's processor system(s) associated with the receiving array calculates that a one or zero has been transmitted by the transmitting array.

While this Figure depicts a highly simplified set of two states, each with a simplified transmitter array and a simplified receiver array in order to convey the means for transmitting a single bit of digital information, by increasing the number of clocks in the receiving array, and by increasing the number of masses in the transmitting arrays and controlling the relative positions of those masses, and then measuring the differential in clock speeds in the receiving array both at any one instant relative to the other clocks in the receiving array and, separately, measuring the differential over time in the clock speeds in the receiving array, complex sets of digital information are encoded, transmitted, received and decoded by the WCIS.

Figure 7:
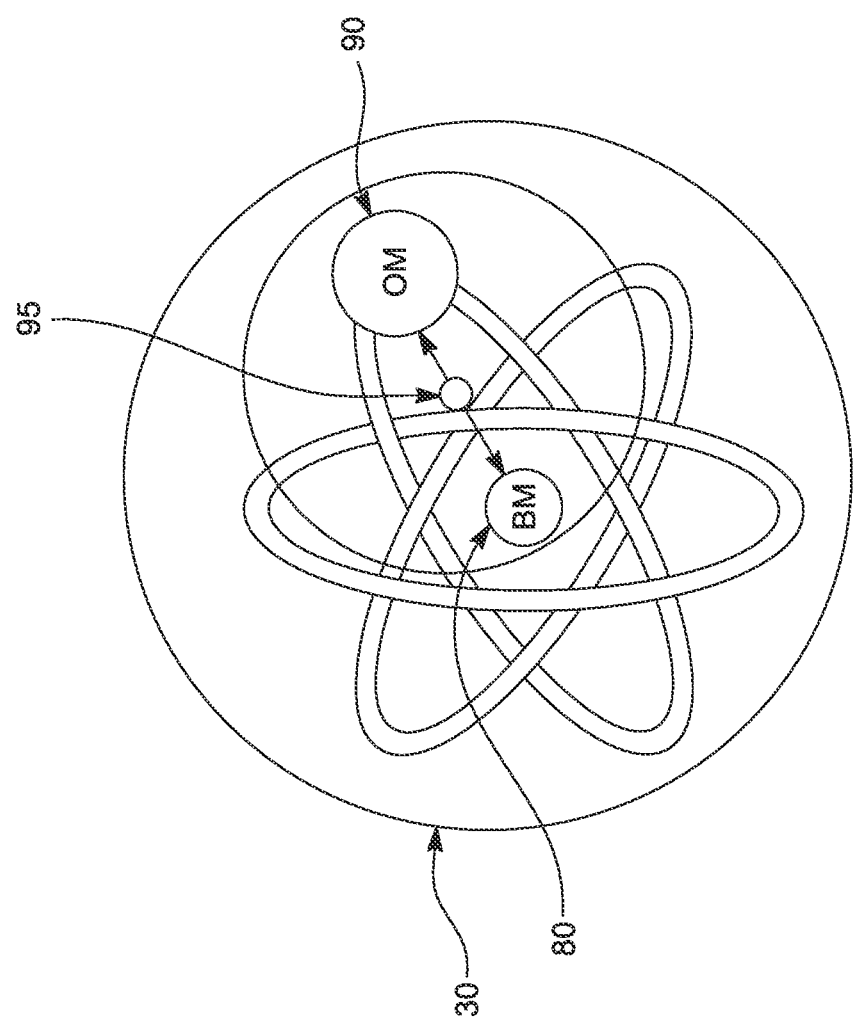
FIG. 7 illustratively depicts a transmitter wherein a relative positioning of a set of synchronized masses enables the encoding of complex digital data sets for decoding by a receiver.

FIG. 7 depicts a transmitter constellation of masses 30 wherein a baseline mass 80 is orbited by an orbiting mass 90 thereby creating a moving center of gravity 95 between the two masses of the transmitter constellation. By adding additional masses to the transmitting array, and controlling their orbits relative to the other masses in the transmitting array, the motion of the center of gravity encodes its own measurable effect on the clock speeds of the receiving array of clocks.

The motion of this center of gravity imparts additional data encoding to the transmission array as well as a further unique identifier pattern for the receiving array to track in order to assist in isolating the data transmitted from that array from data transmitted from other transmission arrays (in an implementation wherein there are multiple transmission arrays sending data to that specific receiving array).

Figure 8:
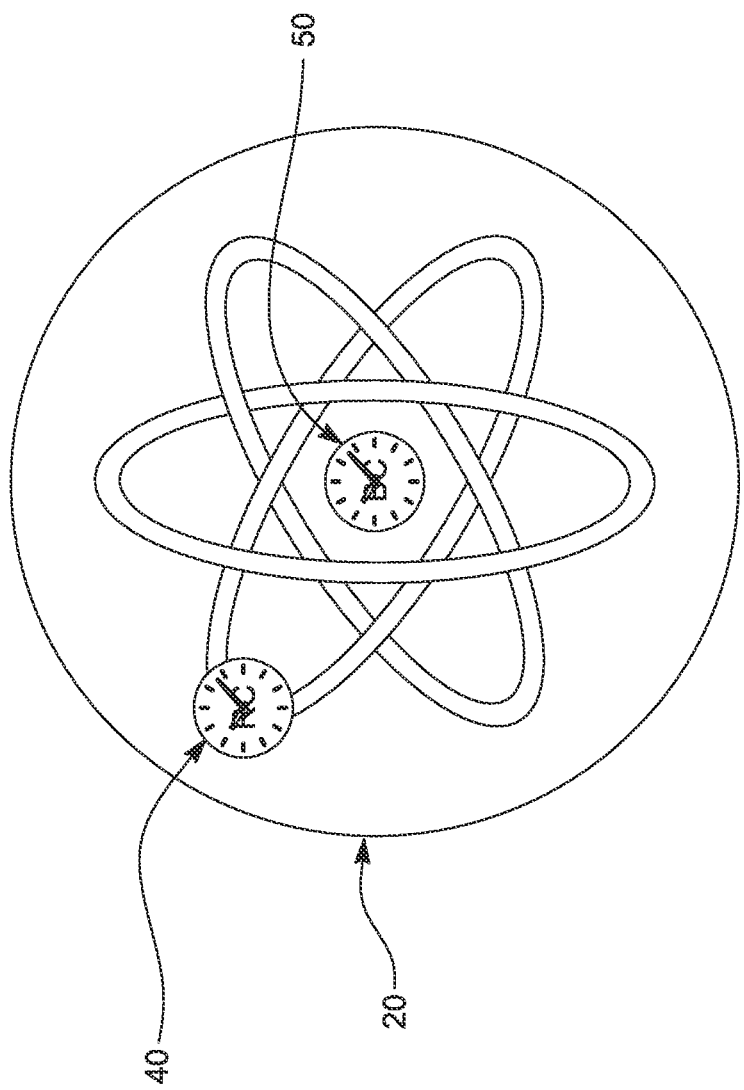
FIG. 8 illustratively depicts a receiver utilizing an orbiting constellation of clocks thereby enabling multi-referential clockspeed pattern recognition for decoding complex data sets encoded into a transmitter.

FIG. 8 depicts a receiving array of clocks 20 in the form of a constellation of clocks wherein there is a baseline clock 50 and an orbiting clock 40, and wherein the orbit of the orbiting clock around the baseline clock 50 may be spherical and/or elliptical.

This FIG. 8 further depicts the receiving constellation 20 wherein each individual clock 40, 50 has a separate clock speed in relation to the transmitting array of masses, and the constellation as a whole has an aggregate clock speed measured by aggregating the clock speeds of each of the individual clocks in the constellation.

The number and programmatic settings of the orbits of clocks determines the complexity and scope of data transmissions that a receiving array is capable of receiving, both simultaneously and over a factor of time. This implementation of the receiving array as a multi-plane orbiting constellation of clocks around a baseline clock further enhances the capabilities of the receiving array to simultaneously receive complex sets of data from multiple transmitter sources. The decoding of the transmitted data involves tracking the clock speeds of each of the clocks in the constellation throughout their orbits both individually and comparatively across all of the orbiting clocks and the baseline clock, and algorithmically decoding to identify patterns of clock speed changes relating to independent transmitters. The multi-plane orbits of the clocks means that each clock individually has a clock speed measurably different from the other clock speeds of the other clocks at any one time and though out the trajectory of the clock as it moves through its orbit. By analyzing and algorithmically parsing the clock speeds of each clock relative to all the clock speeds of all the other clocks in the array, patterns of clock speeds enable isolation of received data across multiple transmitters.

By tracing patterns of clock speeds in orbiting receiving arrays and applying machine and predictive learning, the processor system associated with the receiving array can be coded to make predictions about the data still to be transmitted in a set of data only partially received. These prediction models in applicable receiving systems enable enhanced error correction capabilities in received data sets.

Figure 9:
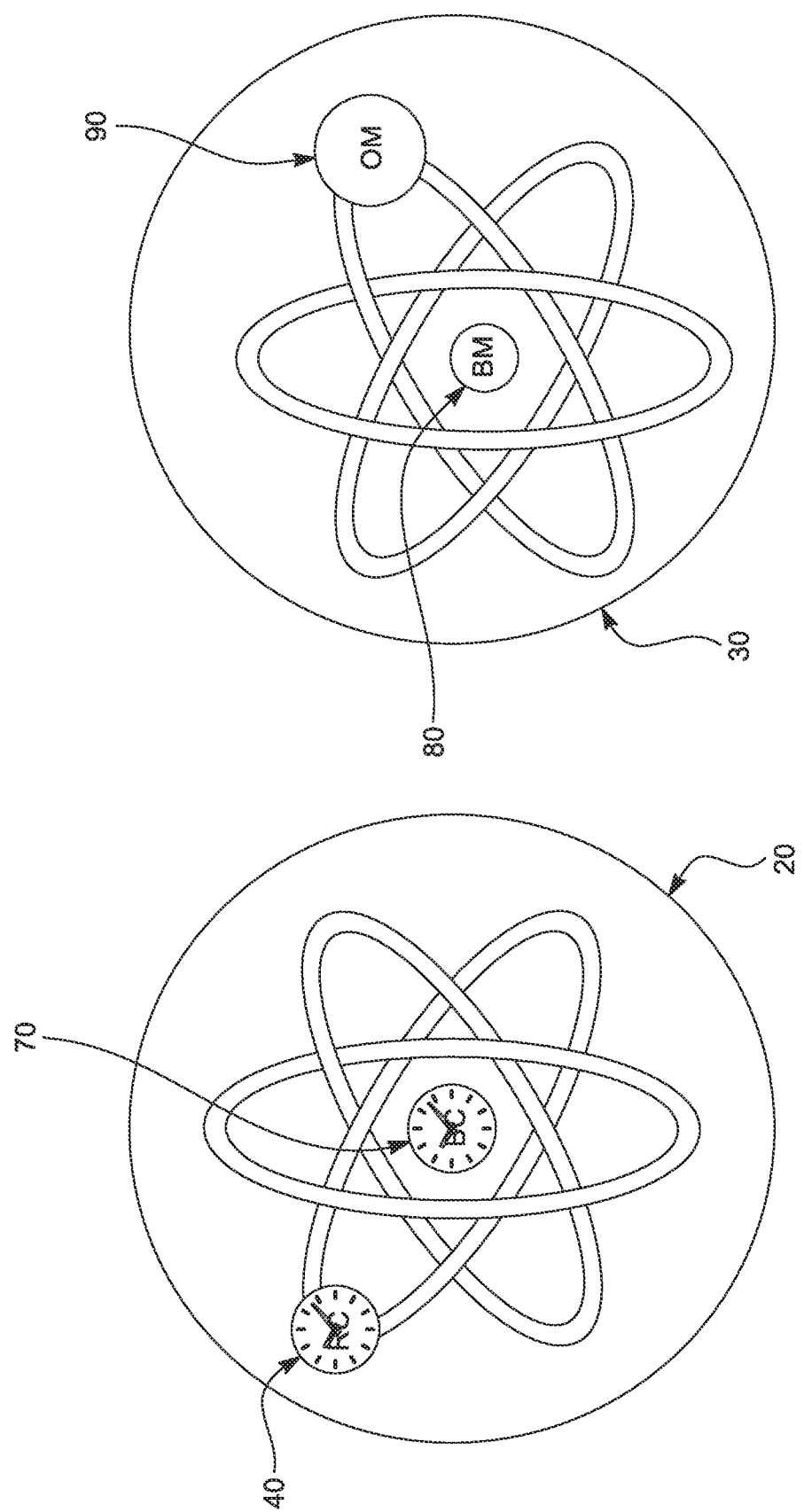
FIG. 9 illustratively depicts together the transmitter of FIG. 7 and the receiver of FIG. 8.

FIG. 9 depicts a receiving array 20 of receiving clocks orbiting a central receiving (baseline) clock, and a transmitter array 30 of orbiting transmitter masses orbiting a central (baseline) mass wherein the controlled motion of the masses in the receiver individually measurably affect the individual clock speeds of the individual clocks in the receiving array, and the motion of the aggregated center of gravity of the masses in the transmitting array affects the aggregated clock speeds of the clocks in the receiving array. In this FIG. 9, a single receiving clock 40 is orbiting a single baseline clock 70 in the receiving array 20]; and a single orbiting mass 90 is orbiting a baseline mass 80 in the transmitting array 30. Examples of some other potential orbits are shown schematically.

FIG. 10 is a similar depiction as FIG. 9 except with multiple receiving clocks in the receiving array 20, and multiple transmitting masses in the transmission array 30. The orbits are shown schematically, and are implemented on a multi-plane basis wherein the orbit of one of the receiving clocks is in a different planar orbit than the other orbiting receiver clocks. Further, the orbits may be at different distances from the baseline clock and may be spherical or elliptical in shape. As the complexity of types of orbits and planes increase, the capability of the receiver to capture complex data from one or more transmitter arrays increases because the number of separately algorithmically identifiable patterns of clock speed variations among the clocks in the receiving array increases, and those patterns decode into the data that was transmitted by each of the transmitter arrays.

FIG. 11 is a side view of a receiving array system (SOMT) 20 and a transmitting array system (MSOR) 30 (as described in prior Figures) with an object 1000 between them, wherein the variation in the internal mass structure of the object 1000 is imaged by the WCIS as the predicted measurements by the MSOR of the data transmitted by the SOMT is measurably altered by the internal mass structure of the interposed object 1000. To optimize the imaging, the MSOR and SOMT may be coordinated independently of the object 1000 to assist in precise imaging such that, for instance, a processor system common to both the transmitter array and the receiver array is input both the transmission data and the associated receiving data under a model where there is not object 1000 between the transmission array and the receiving array in order to compare the actual received data set with the model received data set with the divergence algorithm generating an image of the internal mass structure of the object 1000.

FIG. 12 depicts the arrangement described in FIG. 11 except that the motion of the transmitting array 30 is remotely controlled and/or programmatically controlled utilizing autonomous vehicle capabilities integrated into each of the masses such that the transmitting constellation as a whole is moveable and the orbits of the orbiting masses individually are moveable as determined by the programming and/or remote operator.

The disclosed communication system is independent of scale. For instance, one implementation of the receiving array of clocks is implemented using the onboard clocks in an array of satellites in geostationary orbit. In an alternative implementation, a receiving array of a set of clocks is placed on the surface of one or more of the radio telescopes that make up the Karl G. Jansky Very Large Array.

On a different scale is an implementation of an imaging system wherein the object between the MSOR and SMOT is a human body, and the distance between the MSOR and SMOT is a few yards.

As miniaturization and sensitivity of receiving clock arrays improve through a combination of more advanced construction techniques and algorithms, the opportunities will multiply to utilize implementations of the disclosed system to transmit/receive and image across both longer and shorter distances, and across multiple fields and applications It will be noted by those persons of ordinary skill in the art that the various components that comprise the invention described herein may each be implemented using any of several known off-the-shelf components.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted in the context. The terms "comprising," "having," "including" and "containing" are to be construed as open-ended terms (i.e., meaning "including, but not limited to") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Accordingly, the invention should only be limited by the appended claims and equivalents thereof, which claims are intended to cover such other variations and modifications as come within the spirit and scope of the invention.

What is claimed is:

1. A wireless communications system comprising:
   a receiver; and
   a transmitter,
   wherein the receiver comprises:
      a synchronized array of clocks, wherein a speed of time measured by each one of the clocks in the synchronized array of clocks relative to the other clocks is tracked, and
   wherein the transmitter comprises:
      a constellation of masses, wherein a relative position of individual ones of the masses of the constellation of masses encodes digital data sensed by the receiver in the form of a gravity field change that causes a difference in the speed of clocks measured and utilized by the receiver which clock speed differential corresponds to and enables the replication of the original digital data set that was input into the transmitter.

2. The system of claim 1 wherein the receiver comprises an array of clocks physically attached to a curved planar surface.

3. The system of claim 2 wherein the receiver array is directionally controlled by a gimbal-and-motor system such that the receiver array's planar surface is directionally pointable.

4. The system of claim 2 wherein physical arrangement of clocks is managed by vehicles in which each clock is located, which vehicles incorporate independent remotely controllable power and movement systems such that the locations of the clocks in relation to each other is maintained remotely and/or autonomously.

5. The system of claim 1 wherein the digital data is encoded in a form of patterns of locations and movement of the masses in the transmitter such that the coordinated locations and movement of the masses determine a set of clock speed differentials among the clocks in the receiver, which differentials are programmatically decoded to replicate the digital data provided by the transmitter.

6. The system of claim 5 wherein an image of an internal mass structure of an object interposed between the transmission array and the receiving array is determined based on a differential between:
   a predicted data received in the absence of the interposed object, and
   an actual data received.

7. The system of claim 1 wherein the receiver utilizes a set of autonomous vehicles programmatically controlled for dynamic array positioning relative to each other and relative to one or more transmitting arrays.

8. The system of claim 1 wherein the transmitter comprises a set of autonomous vehicles programmatically controlled for array positioning relative to each other and relative to one or more receiving arrays.

* * * * *